US006651826B1

(12) United States Patent
Schiffman

(10) Patent No.: US 6,651,826 B1
(45) Date of Patent: Nov. 25, 2003

(54) INTERLOCKING PIPE STORAGE SYSTEM

(75) Inventor: Jay Schiffman, New Hope, PA (US)

(73) Assignee: Ahimsa Studios, Inc., New Hope, PA (US)

(*) Notice: Subject to any disclaimer, the term of this patent is extended or adjusted under 35 U.S.C. 154(b) by 0 days.

(21) Appl. No.: 10/160,743

(22) Filed: May 31, 2002

(51) Int. Cl.$^7$ .................................................. A47F 7/00
(52) U.S. Cl. .................... 211/40; 211/189; 211/182; D6/407
(58) Field of Search .................... 211/40, 182, 189; D6/407; 312/9.9; 206/308.1

(56) References Cited

U.S. PATENT DOCUMENTS

| 3,461,842 | A | * | 8/1969 | Conrad et al. | |
|---|---|---|---|---|---|
| 4,099,626 | A | | 7/1978 | Magnussen, Jr. | |
| 4,102,275 | A | | 7/1978 | Spound et al. | |
| 4,182,244 | A | | 1/1980 | Hutchins, Jr. et al. | |
| 4,247,011 | A | | 1/1981 | Walter | |
| 4,423,913 | A | | 1/1984 | Lee | |
| 4,550,838 | A | | 11/1985 | Nathan et al. | |
| 4,781,644 | A | * | 11/1988 | Yoshida | 211/182 X |
| 5,046,789 | A | | 9/1991 | Lee | |
| 5,195,642 | A | * | 3/1993 | Dardashti | 211/40 X |
| 5,269,419 | A | | 12/1993 | Aldeguer et al. | |
| 5,285,907 | A | | 2/1994 | Franchere et al. | |
| D357,331 | S | * | 4/1995 | Yeh | D6/407 X |
| 5,409,122 | A | | 4/1995 | Lazarus | |
| 5,542,550 | A | * | 8/1996 | Kakavoulis-Perera et al. | 211/40 |
| 5,618,101 | A | * | 4/1997 | Yeh | |
| 5,678,706 | A | | 10/1997 | Husak et al. | |
| 5,947,305 | A | | 9/1999 | Lin | |
| 5,967,338 | A | * | 10/1999 | Rosario | 211/40 |
| 5,992,647 | A | | 11/1999 | Malik | |
| 6,039,563 | A | | 3/2000 | Hardy | |
| D426,092 | S | | 6/2000 | Neustadt | |
| D426,902 | S | | 6/2000 | Hardy et al. | |
| 6,116,437 | A | | 9/2000 | Rowe | |
| 6,155,435 | A | | 12/2000 | Malik | |
| 6,209,735 | B1 | | 4/2001 | Galdstone et al. | |
| 6,290,074 | B1 | | 9/2001 | Syvuk et al. | |
| 6,510,952 | B1 | * | 1/2003 | Robert | 211/40 |

* cited by examiner

Primary Examiner—Robert W. Gibson, Jr.
(74) Attorney, Agent, or Firm—Akerman Senterfitt

(57) ABSTRACT

A storage system includes a plurality of interlocking storage pipes, each having an externally opening storage space. Each interlocking storage pipe has a pipe body extending to at least two connecting terminals. Some pipes have a connecting terminal that is oriented at an angle relative to other connecting terminals of the pipe. Thus, an elbow pipe, a T-pipe and a cross-shaped pipe are disclosed. The variously shaped pipes permit the user to join the pipes in different combinations to provide various storage system arrangements. The connecting terminals permit the storage spaces of the pipes to be oriented at different angles relative to each other, thereby providing additional storage arrangement possibilities.

28 Claims, 5 Drawing Sheets

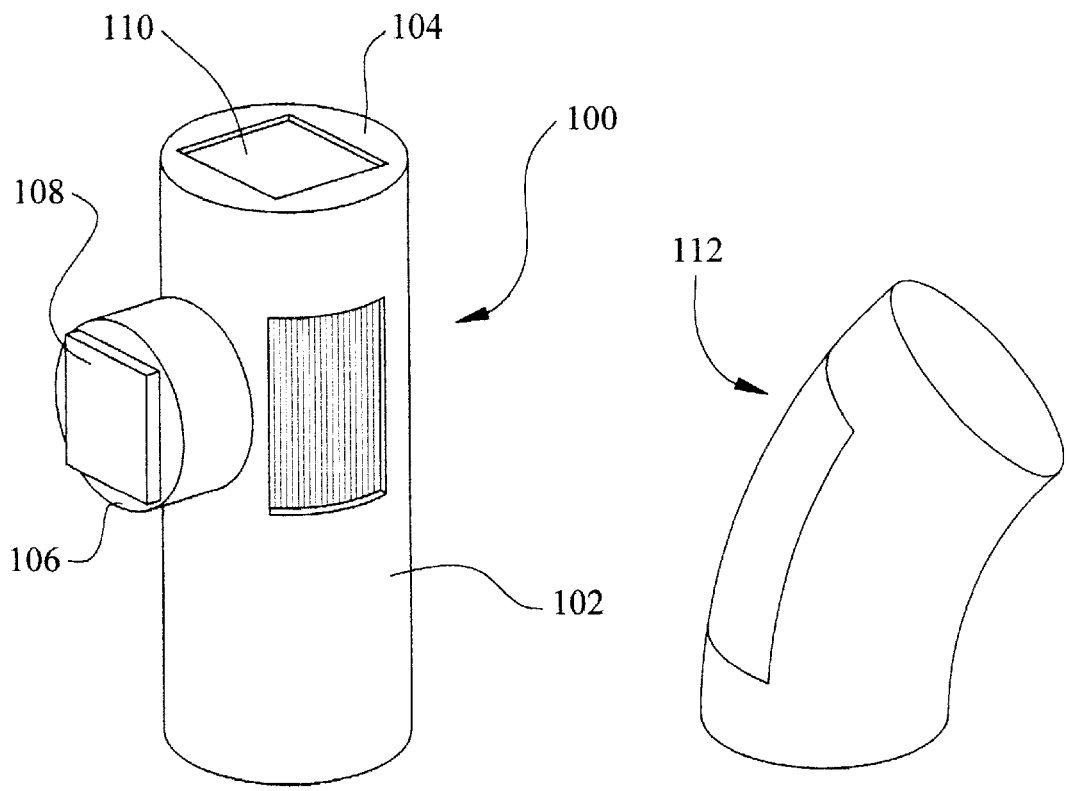
FIG. 8
FIG. 9
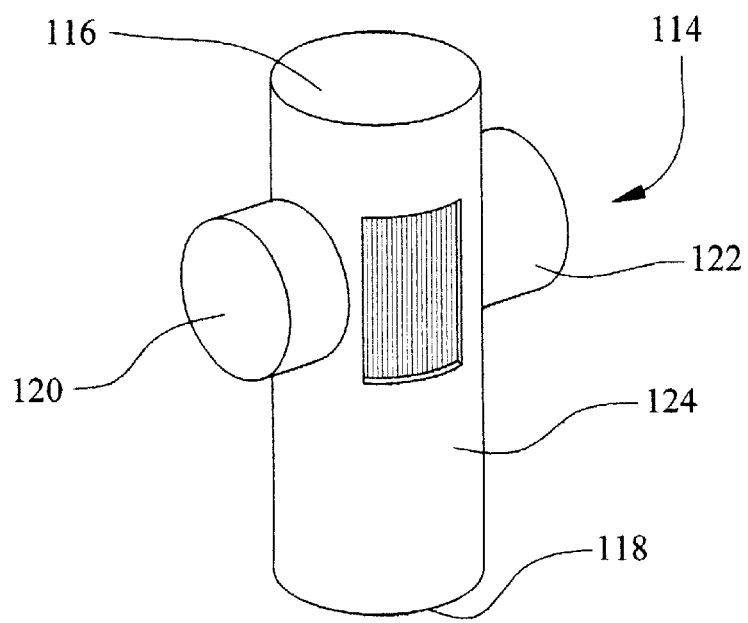
FIG. 10

INTERLOCKING PIPE STORAGE SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF INVENTION

1. Technical Field

The present invention relates generally to a system for storing items. More particularly, the invention relates to a storage system having interlocking storage units to provide different storage arrangements.

2. Description of the Related Art

Prior storage systems utilizing interconnecting storage units typically are directed to stackable blocks with open fronts. Such storage units are typically large to accommodate items to be stored and are limited in the possible stacking arrangements. Further, because of the size and shape of the units, positioning relative to other furniture and appliances, such as entertainment units and computers, is also limited.

Some efforts to use tubular storage units have been made. However, such use has focused on access to the hollow centers through open ends of the tubes. The tubes are connected in stacking fashion along the sides of the tubes, as shown in U.S. Pat. No. 6,209,735 B1 to Gladstone et al. Thus, the positioning options and storage space size are again limited.

SUMMARY OF INVENTION

It is an object of the present invention to provide an interlocking pipe storage system, in which pipes of different configurations and orientations can be used to provide numerous alternative arrangements for positioning around existing furniture and equipment in three dimensions. The present invention also seeks as another object to provide a storage system that enables orientation of open storage spaces at different angles of orientation to accommodate the particular storage needs and space arrangements of the user.

According to aspects of the invention, an interlocking pipe storage system includes at least two pipes. One pipe has a first pipe body extending between first and second connecting terminals. At least one externally open storage space is provided between said first and second connecting terminals, and opens externally on a surface of said first pipe body.

The second pipe also has a pipe body extending between third and fourth connecting terminals, and has at least one externally open storage space between said third and fourth connecting terminals that opens externally on a surface of said second pipe body. In the second pipe body, the third and fourth connecting terminals are oriented at an angle relative to each other. The orientation of a connecting terminal refers to the axis of connection with connecting terminals of other pipes. For example, a 90-degree elbow pipe has a curved body so that the connecting terminal at each end of the elbow is oriented to connect to other pipes along an axis that is angled 90 degrees relative to the connection axis of the other connecting terminal of the elbow pipe.

The connecting terminals of each pipe are constructed to. removably and selectively connect to one of the connecting terminals of the other pipe. Thus, with the angled connecting terminals of the second pipe, the two pipes can be connected in different angular arrangements to provide alternative storage configurations.

The connecting terminals of pipe can be constructed in a variety of manners so long as they are capable of connecting interchangeably with the connecting terminals of other pipes. Preferably, the connecting terminals are formed to provide a male-female sliding connection, whereby one connecting terminal is sized slightly larger than a mating connecting terminal of another pipe. The pipes can connect by pushing the connecting terminals together into a nesting relationship.

Alternatively, the connecting terminals, or some of them, can be constructed to connect to a joining bracket, which joins two connecting terminals together indirectly. In the case of connecting terminals with the preferred circular cross-section, the joining bracket can be a ring.

The connecting terminals can also have solid, planar surfaces within their periphery. When so constructed, the connecting terminals themselves can serve as shelving surfaces when oriented horizontally.

The externally open storage space formed in the body of each pipe faces generally in a certain direction. The orientation of the storage space opening refers to the direction of opening relative to the connecting axis of the connecting terminals of the pipe.

According to another aspect of the invention, the connecting terminals are preferably constructed to connect to each other so that the storage space openings of two connecting pipes face at different angles. Thus, for example, the storage space of one pipe can face forward, while the storage space of a second pipe faces upward, rearward, downward or at a different angle between these transverse orientations. The particular angle of orientation can be selected by turning one pipe to the desired orientation prior to connection to another pipe.

The connecting terminals can be constructed to permit connection at any angle between 0 and 360 degrees. For example, the preferred circular cross section for the connecting terminals allows connection at any angle of relative orientation. Alternatively, the connecting terminals can be shaped, such as polygonal, to permit connection at predetermined indexed angles. A triangular shape would provide three positions at 120-degree intervals. A square shape would permit connection at various 90-degree orientations. A pentagon shape would permit 5 different orientations at 72-degree intervals. A hexagon would permit 6 different orientations at 60-degree intervals, and so on.

The cross-section of the pipes and of the connecting terminals are preferably the same, and all are preferably circular. However, the cross-section of the pipes and the connecting terminals can be different. The various cross-sections can include polygon, parallelogram, ellipse and triangle. The cross sections of the connecting terminals can be larger than the cross sections of the pipe bodies.

The pipe bodies can have a variety of shapes. At least one pipe can be elongated, having connection terminals at opposite ends of the axis of elongation. A T-shaped pipe can be provide with two opposing connecting terminals at either end of an elongated body, and a third connecting terminal extending laterally from the pipe body, preferably substantially perpendicular to the axis of elongation.

Alternatively, the third connecting terminal of the T-pipe can extend at a non-transverse angle. The third connecting member can extend outwardly from the side of the pipe body anywhere along its length, but preferably extends midway along the axis of elongation. The third connecting member can extend outwardly any distance, including substantially flush with the side of the pipe body. The storage space opening preferably faces in a direction transverse to the connecting axis of the third connecting terminal and is positioned adjacent to the third connecting terminal.

An interlocking storage pipe can also be formed as a cross-shaped member. The pipe body can be elongated with connecting terminals at each end, and a pair of connecting terminals facing laterally from opposite sides of the pipe body. Preferably, the side connecting terminals are oriented substantially perpendicular to the axis of elongation and in opposite directions, thereby forming the cross-shaped member. Alternatively, the side connecting terminals can extend at non-transverse angles. The side connecting terminals can extend any distance, including substantially flush with the pipe body. The storage space opening preferably faces substantially transverse to the connecting axis of the lateral connecting terminals.

An interlocking storage pipe can also have a curved body to form an elbow. The arc of curvature is preferably 90 degrees, but can be other lesser or greater angles. The connecting terminals are preferably located at the ends of the curved body. The longer arc of the elbow is referred to as the top of the elbow. The storage space opening of the elbow is preferably located along this top surface.

The storage space can provide a hollow storage area. Additionally, slats or other dividers can be positioned in the storage space to separate items. Other storage structure, such as pegs, dividers or molded shapes for specific items can also be provided. The storage structure can be removable and interchangeable. The storage space opening can also be equipped with a door or other openable closure.

Because of the modularity of the pipes, the different shaped pipes can be interchangeably connected to form different storage arrangements. For example, elongated pipes together with two T-pipes can be used to form an H-shaped storage system or an inverted U-shaped storage system. Because the pipes can be connected to provide systems of different heights and widths and can be asymmetrically arranged, the modular pipe storage system can be assembled to integrate into or around existing furniture, for example, computer desks, home entertainment centers and electronic gaming areas.

The invention thus presents a storage system that provides storage capacity suitable for storing goods of varying sizes and dimensions, while also providing the flexibility and convenience of having different combinations of angled units to adapt to varying storage environments.

BRIEF DESCRIPTION OF THE DRAWINGS

The invention may be better understood by referring to the following description taken in conjunction with the accompanying drawings, it being understood, however, that the invention is not limited to the precise arrangements and instrumentalities shown.

FIG. 8 shows a perspective view of an exemplary interlocking storage pipe having a different cross-section for the connecting terminals than the cross-section of the pipe body;

FIG. 9 shows a perspective view of an exemplary interlocking storage pipe having an elbow geometry curved at a random angle; and FIG. 10 is a perspective view of an exemplary interlocking storage pipe having four connecting terminals arranged in a cross-shape.

DETAILED DESCRIPTION OF PREFERRED EMBODIMENTS

The present invention relates to a storage system using interlocking storage pipes. Embodiments according to principles of the invention provide the convenience and flexibility of accommodating multiple goods through the use of selectively connectable pipes that can be arranged in a variety of positions for placement around existing furniture and equipment, and that direct storage space in a wide range of positions and angles to suit the user's needs. Although the illustrations provided herewith depict aspects of the invention in specific embodiments, it is to be understood that the illustrations are for illustrative purposes only, and the invention can exist in several additional embodiments.

Figure 1:
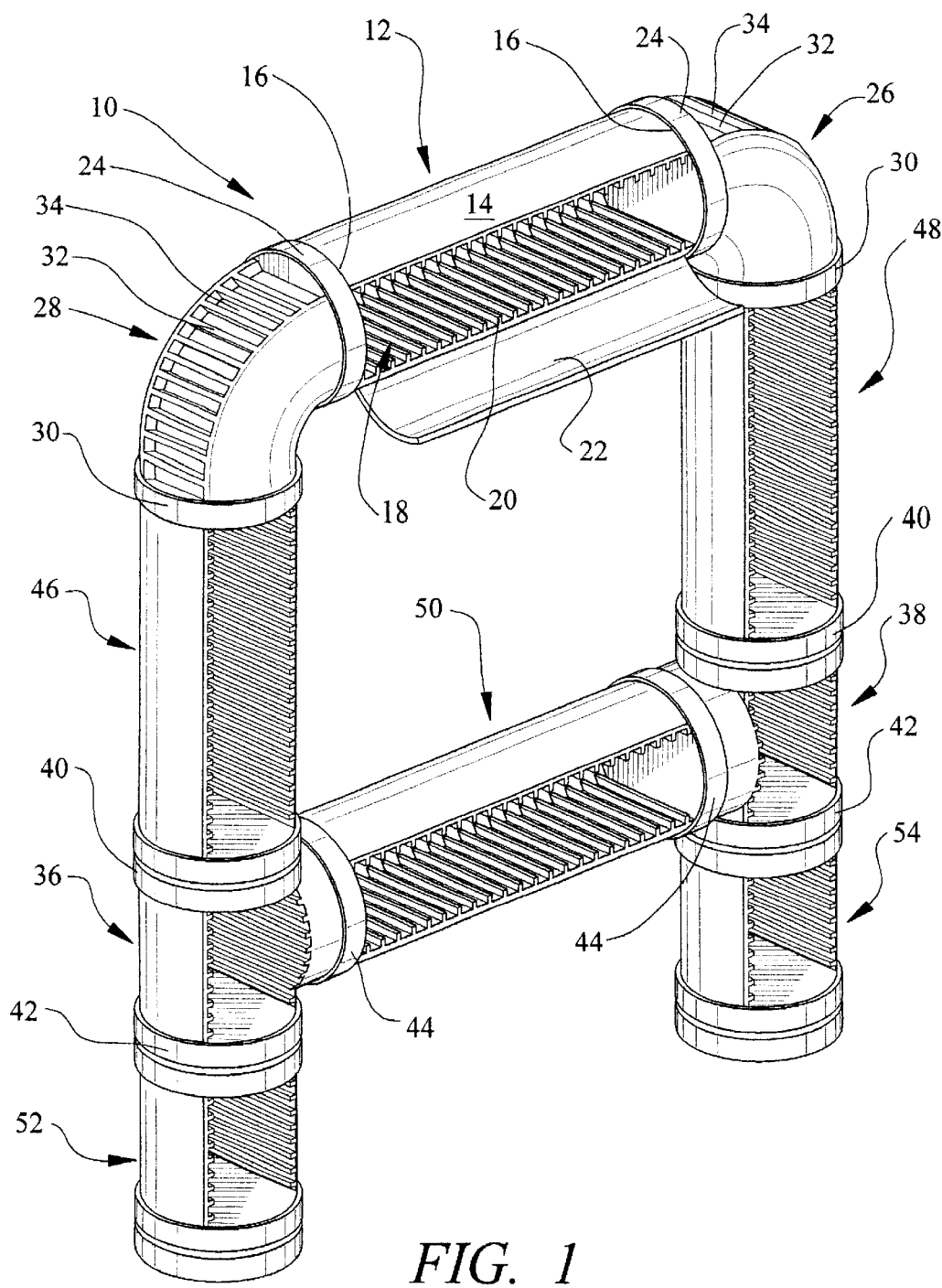
FIG. 1 shows a perspective view of an exemplary embodiment of an interlocking pipe storage system.

Referring to FIG. 1, an interlocking pipe storage system can include a plurality of interlocking pipes connected together in selective arrangements, such as an A-shaped combination 10. Each interlocking pipe, for example, a pipe 12, has a pipe body 14 that extends between at least two connecting terminals 16. The pipe 12 can be elongated with a connecting terminal 16 at each end of the axis of elongation. Each pipe, such as the pipe 12, defines a storage space 18 that is open externally on a surface of the pipe body 14. The storage space 18 can be shaped and positioned on the pipe body 14 in a variety of ways depending on the nature of the items to be stored. The storage space 18 of the pipe 12 is generally rectilinear and is provided optionally with slats 20 to hold and separate CD jewel boxes, but other arrangements are possible. The storage space 18 is preferably open, but can also be equipped with a closure, such as a hinged door 22.

The connecting terminals of each pipe are constructed to engage connecting terminals of other interlocking pipes. Preferably, the connecting terminals, such as those of the pipe 12, are each shaped to slidingly mate with a matching connecting terminal of another interlocking pipe. For example, the connecting terminals 16 of the pipe 12 have a slightly smaller diameter than the relatively enlarged circular connecting terminals 24 of the adjacent pipes 26, 28 so that the pipes 12, 26, 28 are connected by pushing the connecting terminals 16 of the pipe 12 into the respective connecting terminals 24 of the pipes 26, 28 in friction fit manner.

Because each interlocking pipe according to the invention has at least two connecting terminals, the interlocking pipes, such as the pipe 12 and another pipe, can be connected in different combinations to create different storage arrangements. The connecting terminals can be constructed to connect in different manners, such by friction fitting as mentioned above as well as by snapping together or screwing together. The connecting terminals can constructed to connect laterally rather than by being pushed together, but a friction fit by pushing together is preferred. The connecting terminals of two interlocking pipes can connect directly to each other.

Alternatively, a connecting bracket, which is a ring in the case of circular pipes, can be used to connect two adjacent connecting terminals. A connecting bracket can be used, for example, if two connecting terminals to be joined are the same size as each other and matingly fit into slightly larger openings of the connecting bracket. Or, the connecting bracket can be slightly smaller in cross-section and nest within the connecting terminals of two adjacent pipes.

According to the invention, some of the pipes, such as the pipes 26, 28, provide connecting terminals 24, 30 that are oriented at an angle to each other. In general, the orientation of each connecting terminal refers to the direction along which the connecting terminal connects to other connecting terminals. Thus, each interlocking pipe 26, 28 is formed as an elbow that curves 90 degrees, so that the first connecting terminal 24 is oriented 90 degrees relative to the second connecting terminal 30. The angle of relative orientation of the elbow pipes 26, 28 can be other angles than 90 degrees.

In each elbow pipe 26, 28, a storage space 32 is provided with an opening along the upper, longer arc of the respective elbow 26, 28. The storage space 32 can be equipped with slats 34 to divide the space for separating and holding items. The slats 34 can be permanent, as a shown, or removable.

Another interlocking pipe arrangement that provides connecting terminals at angles to each other embodied in pipes 36, 38. Each pipe 36, 38 is arranged as a T-pipe with two connecting terminals 40, 42 at each end of the pipe body's axis of elongation and a third connecting terminal 44 extending, in this example, at an angle of 90 degrees relative to the other two connecting terminals 40, 42. Alternatively, the third connecting terminal 44 can extend at a non-transverse angle, upwardly or downwardly. The third connecting terminal 44 can extend from the side of the pipe body at any distance, but is preferably substantially flush with the side of the body of each pipe 36, 38, as shown.

The other pipes 46, 48, 50, 52, 54 have similar construction and are joined with connecting terminals as discussed above.

Figure 2:
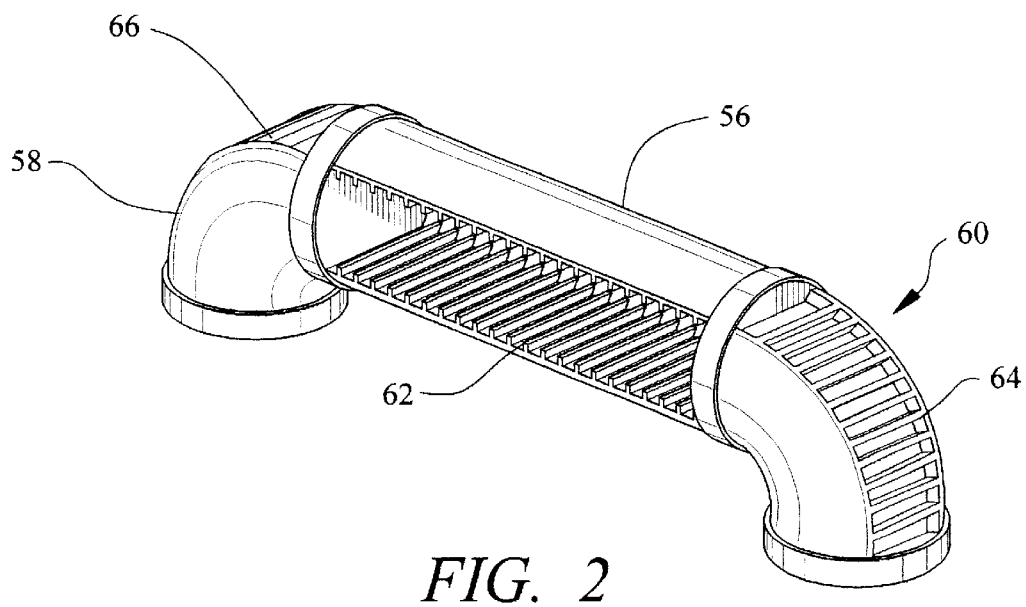
FIG. 2 shows a perspective view of an alternative embodiment using an elongated storage pipe connected between two elbow storage pipes.
Figure 3:
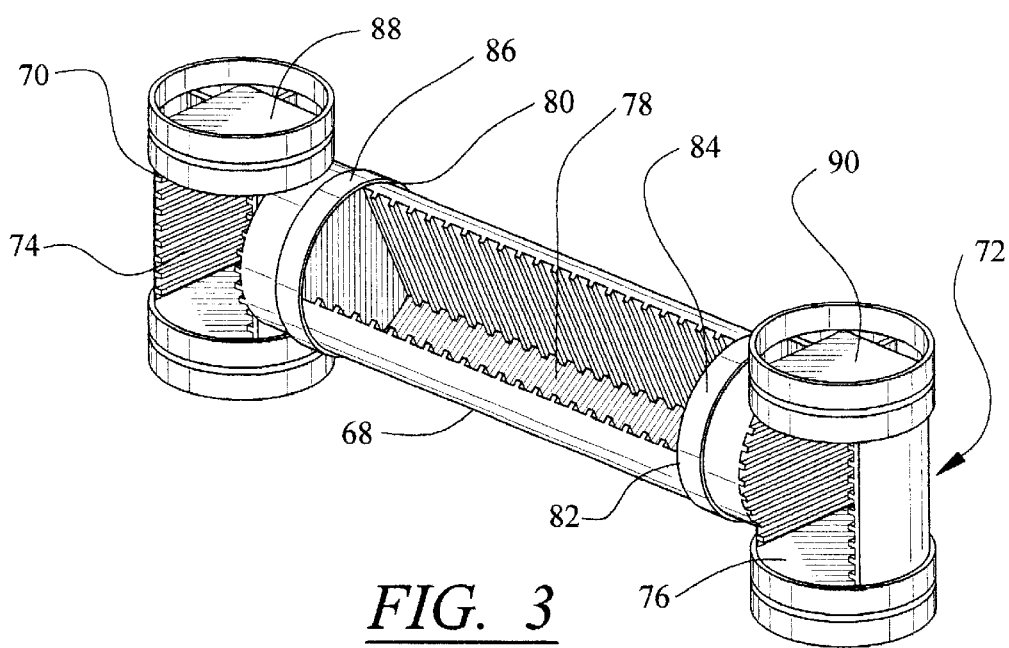
FIG. 3 shows a perspective view of a further alternative embodiment using an elongated storage pipe connected between two T-shaped storage pipes, illustrating an angular variation in the orientation of the storage spaces of the respective pipes.

Referring to FIGS. 2 and 3, the interlocking pipes according to the invention can be combined in different arrangements. As shown in FIG. 2, an elongated pipe 56 can be connected to two elbow pipes 58, 60 to provide a free standing storage system in which a storage space 62 is oriented forward, while two additional storage spaces 64, 66 are oriented laterally at 90 degrees to the forward storage space 62.

FIG. 3 illustrates a further arrangement according to the invention in which an elongated pipe 68 is connected to two T-pipes 70, 72. The T-pipes 70, 72 can be arranged as shown with the storage openings 74, 76 facing forward. According to a significant aspect of the invention, the connecting terminals permit the interlocking pipes to be joined so that the storage space of one interlocking pipe is oriented at a non-transverse angle relative to the storage space of another interlocking pipe. For example, the storage space opening 78 of the elongated pipe 68 is angled upwardly at approximately 45 degrees to the horizontal, while the storage space openings 74, 76 of the T-pipes 70, 72 face forward. In the preferred embodiment in which the connecting terminals 80, 82, 84, 86 are circular and engage by a mating push fit, the relative angle of orientation of the storage space openings can be selected between 0 and 360 degrees.

The T-pipes 70, 72 shown in FIG. 3 include another feature according to the principles of the invention. The upper connecting terminals 88, 90 can each provide a planar surface, which when oriented horizontally as shown, provides an additional storage surface for resting items (not shown).

Referring to FIGS. 4–7, the interlocking pipes and their connecting terminals can have various cross-sectional geometries, including polygonal 92, parallelogram 94, elliptical 96 and triangular 98, in addition to the preferred circular cross-section. Additionally, the cross-sectional geometry of the connecting terminals can be different than that of the pipe body. As shown in FIG. 8, for example, the pipe 100 has a pipe body 102 that can have a circular cross-section while the connecting terminals 104, 106 have a rectilinear cross-section, which can include a mating projection 108 and recess configuration 110.

Figure 4:
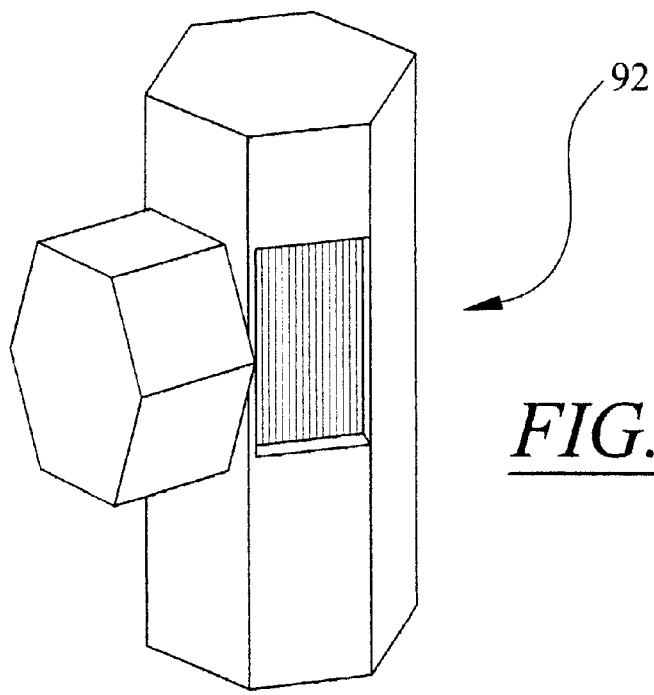
FIG. 4 shows a perspective view of an exemplary interlocking storage pipe having a polygonal cross-section.
Figure 5:
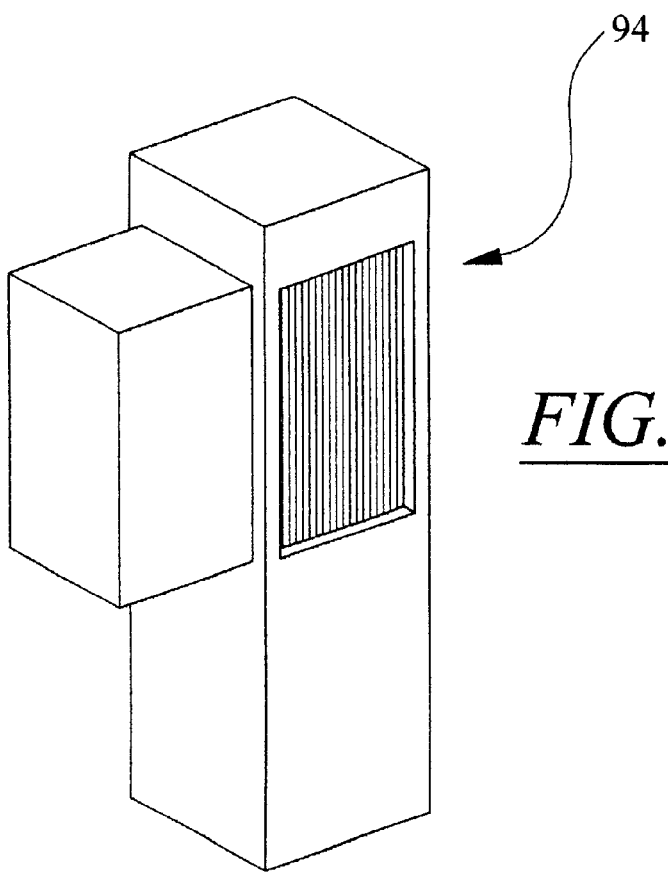
FIG. 5 shows a perspective view of an exemplary interlocking storage pipe having a rectilinear cross-section.
Figure 6:
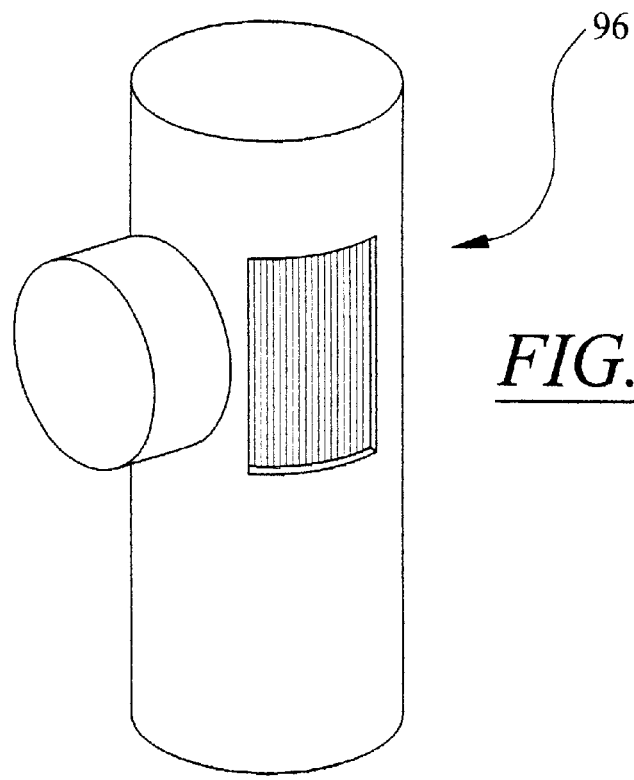
FIG. 6 shows a perspective view of an exemplary interlocking storage pipe having an elliptical cross-section.
Figure 7:
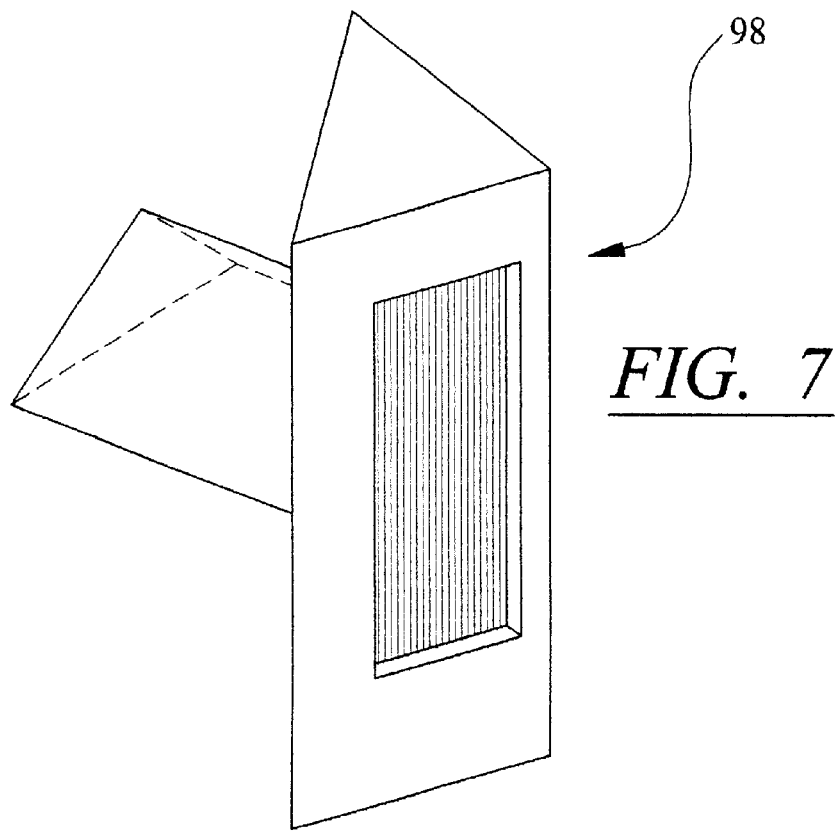
FIG. 7 shows a perspective view of an exemplary interlocking storage pipe having a triangular cross-section.

The different geometries of the connecting terminals can be chosen to set the number of relative angular positions of two joined storage pipes. For example, while the preferred circular cross-section permits orientations between two pipes of 0 to 360-degrees, a hexagonal cross-section, as shown in FIG. 4, permits six angular positions, each 60-degrees apart. A rectilinear cross-section of the connecting terminals, as shown in FIG. 5, permits four angular positions, each 90-degrees apart. An elliptical cross-section, as shown in FIG. 6, permits two angular positions, each 180-degrees apart. A triangular cross-section, as shown in FIG. 7, permits three angular positions, each 120-degrees apart.

According to the invention, an interlocking pipe for use in the storage system can have connecting terminals at non-transverse angles, such as the elbow pipe 112 shown in FIG. 9. Further, as shown in FIG. 10, an interlocking pipe 114 can provide four connecting terminals, two opposing terminals 116, 118 at each end of axis of elongation and two opposing lateral connecting terminals 120, 122 extending from the side of the pipe body 124, thus forming a cross-shaped pipe. The lateral connecting members can extend any distance. The lateral connecting terminals 120, 122 preferably extend so that their orientation is substantially transverse to the axis of elongation, but the orientation of the lateral connecting terminals 120, 122 can each be oriented at a non-transverse angle. Also, each of the lateral connecting terminals can extend different angles relative the axis of elongation, so that, for example, one lateral connecting terminal can extend upwardly at 30 degrees to the horizontal while the other extends upwardly at 45 degrees, or downwardly at 60 degrees.

It should be noted that the pipes illustrated in FIGS. 4–10 are depicted conceptually. Each has a storage opening on its body and has connecting terminals shaped to mate or otherwise connect to other pipes, just as described with respect to the embodiments of FIGS. 1–3.

The storage system pipes can be formed from any suitable material. For example, the interlocking storage pipes can be constructed of wood, plastic, particleboard or metal. Also, the pipes can be made transparent, translucent or opaque. The material selected for the storage 10 can vary depending on intended usage of the storage system. For instance, a storage system utilized for storing clothing can be composed of a translucent or transparent material to provide visibility of the goods stored within the storage system. Additionally, the components of the storage system can vary in cross-sectional size and height.

The invention is not limited to the specific details described herein, which are given by way of example only. Various modifications and alterations are possible within the scope of the invention as defined in the appended claims.

What is claimed is:

1. A interlocking pipe storage system comprising:
   a first pipe having a first pipe body extending between first and second connecting terminals, said first pipe body having at least one externally open storage space between said first and second connecting terminals, said storage space opening externally on a surface of said first pipe body;
   a second pipe having a second pipe body extending between third and fourth connecting terminals, said second body having at least one externally open storage space between said third and fourth connecting terminals, said storage space opening externally on a surface of said second pipe body, said third and fourth connecting terminals being oriented at an angle relative to each other, and
   said first and second connecting terminals each being adapted to removably and selectively connect to one of said third and fourth connecting terminals, whereby said first and second pipes can be selectively connected in different arrangements to provide different storage configurations.

2. The interlocking pipe storage device of claim 1, wherein said first and second pipes are selectively connectable through respective connecting terminals so that the storage space opening of the first pipe is oriented at a selected angle from a range between 0 degrees and 360 degrees relative to the storage space opening of the second pipe.

3. The interlocking pipe storage system of claim 1, wherein said first and second pipe bodies each have a circular cross-section, and said first, second, third and fourth connecting terminals have circular cross-sections.

4. The interlocking pipe storage system of claim 2, wherein the cross-section of at least one of the first, second, third and fourth connecting terminals is larger in area than the cross-section of said first and second pipe bodies.

5. The interlocking pipe storage system of claim 1, wherein at least one of said first and second pipes has a non-circular cross-section.

6. The interlocking pipe storage system of claim 5, wherein said non-circular cross-section is selected from the group of a polygon, parallelogram, ellipse and triangle.

7. The interlocking pipe storage system of claim 1, wherein the cross-section of at least one of the first and second pipe bodies is different than a cross-section of at least one of its connecting terminals.

8. The interlocking pipe storage system of claim 7, wherein said at least one pipe body cross-section is selected from the group of a circle, polygon, parallelogram, ellipse and triangle and said at least one connecting terminal cross-section is a different one selected from the group of a circle, polygon, parallelogram, ellipse and triangle.

9. The interlocking pipe storage system of claim 1, wherein said first pipe body is elongated along an axis of elongation, said first and second connecting terminals being located at opposite ends of the axis of elongation.

10. The interlocking pipe storage system of claim 1, wherein said second pipe body is elongated along an axis of elongation, said third connecting terminal and a fifth connecting terminal being located at opposite ends of the axis of elongation and the fourth connecting terminal positioned on the second pipe body and oriented in a substantially transverse direction to the axis of elongation.

11. The interlocking pipe storage system of claim 10, wherein said second pipe body provides an opening of the externally open storage space, said opening being located between the third and fifth connecting terminals and adjacent and substantially transverse to the fourth connecting terminal.

12. The interlocking pipe storage system of claim 1, wherein said second pipe body is elongated along an axis of elongation, said third connecting terminal and a fifth connecting terminal being located at opposite ends of the axis of elongation and the fourth connecting terminal and a sixth connecting terminal being positioned along the second pipe body and oriented in a substantially transverse direction to the axis of elongation, thereby substantially forming a cross.

13. The interlocking pipe storage system of claim 12, wherein said second pipe body provides an opening of the externally open storage space, said opening being located between the third and fifth connecting terminals and adjacent and substantially transverse to the fourth and sixth connecting terminals.

14. The interlocking pipe storage system of claim 1, wherein said second pipe body is curved, forming an elbow, said third and fourth connecting terminals being oriented at an angle relative to each other and positioned at the ends of the elbow.

15. The interlocking pipe storage system of claim 14, wherein the third and fourth connecting terminals are oriented substantially transverse to each other.

16. The interlocking pipe storage system of claim 14, wherein said curved pipe body defines a top surface along the longest arc of the curved pipe body, an opening of the externally opening storage space being disposed on said top surface.

17. The interlocking pipe storage system of claim 1, further comprising slats disposed in at least one of said storage spaces to separate items placed in the storage space.

18. The interlocking pipe storage system of claim 1, further comprising storage structure disposed in at least one of said storage spaces to position items placed in the storage space.

19. The interlocking pipe storage system of claim 18, wherein said storage structure is removable from said storage space.

20. The interlocking pipe storage system of claim 1, further comprising an openable-closure for at least one of said storage spaces.

21. The interlocking pipe storage system of claim 1, wherein at least one of the connecting terminals of said first pipe removably secures to at least one of the connecting terminals of the second pipe by a male-female mating connection.

22. The interlocking pipe storage system of claim 1, further comprising a joining bracket, wherein at least one of the connecting terminals of said first pipe removably secures to the joining bracket and the joining bracket removably secures to at least one of the connecting terminals of said second pipe.

23. The interlocking pipe storage system of claim 1, wherein at least one of said connecting terminals provide a planar surface, whereby said planar surface when oriented horizontally provides a rest surface for items.

24. An interlocking storage pipe, comprising:

a storage pipe having a curved body extending along an arc to form an elbow having at each end of the elbow a connecting terminal, each connecting terminal being oriented at an angle to each other, said body having at least one externally open storage space between said connecting terminals, said storage space opening externally on a surface of said curved pipe body, said curved pipe body defining a top surface along the longest arc of the curved pipe body, an opening of the externally opening storage space being disposed on said top surface.

25. An interlocking storage pipe, comprising:

a storage pipe having a pipe body elongated along an axis of elongation and having a connecting terminal at each end of the axis of elongation, said body having at least one externally open storage space between said connecting terminals, said storage space opening externally on a surface of said pipe body, and a further connecting terminal positioned on said pipe body and oriented at an angle to said axis of elongation.

26. The interlocking storage pipe of claim 25, wherein said further connecting terminal is oriented transverse to said axis of elongation.

27. An interlocking storage pipe, comprising:

a storage pipe having a pipe body elongated along an axis of elongation and having a connecting terminal at each end of the axis of elongation, said pipe body having at least one externally open storage space between said connecting terminals, said storage space opening externally on a surface of said pipe body, and two further connecting terminals positioned on said pipe body oriented in opposing directions, said further connecting terminals being oriented at angles to said axis of elongation.

28. The interlocking storage pipe of claim 27, wherein the further connecting terminals are oriented transverse to the axis of elongation, thereby substantially forming a cross.

* * * * *